United States Patent Office 3,663,615
Patented May 16, 1972

3,663,615
NUCLEAR SULFAMOYL N-ORGANOSULFONYL BENZAMIDES
Carl Ziegler, Glenside, and James M. Sprague, Gwynedd Valley, Pa., assignors to Merck & Co., Inc., Rahway, N.J.
No Drawing. Filed Mar. 2, 1970, Ser. No. 15,915
Int. Cl. C07c
U.S. Cl. 260—556 AC                    6 Claims

ABSTRACT OF THE DISCLOSURE

Nuclear sulfamoyl and nuclear sulfonyl substituted N-organosulfonyl benzamides and salts thereof wherein the benzene ring may be either unsubstituted or substituted by one or more lower alkyl, halo, trihalomethyl, nitro, carboxy, amino, halosulfonyl, alkylsulfonyl or sulfamoyl radicals. The products are prepared by treating a nuclear sulfamoyl- (or sulfonyl)substituted benzoyl halide with an organosulfonamide or salt thereof. The products are useful as uricosuric agents in the treatment of gout and gouty arthritis.

---

This invention relates to a new class of chemical compounds which can be described generally as nuclear sulfamoyl and nuclear sulfonyl substituted N-organosulfonyl benzamides and the non-toxic, pharmaceutically acceptable salts thereof. It is also an object of this invention to describe a novel method for the preparation of the nuclear sulfamoyl- (and nuclear sulfonyl)substituted N-organosulfonyl benzamides.

Pharmaceutical studies indicate that the instant products are effective uricosuric agents, i.e., they promote the excretion of uric acid by the kidney, and are thus useful in the treatment of gout and gouty arthritis. The instant products are also a valuable adjuvant for inhibiting excretion of penicillin, thus maintaining high antibiotic levels in the treatment of conditions that require intensive penicillin therapy.

The nuclear sulfamoyl and nuclear sulfonyl substituted N-organosulfonyl benzamides of this invention are compounds having the following structural formula:

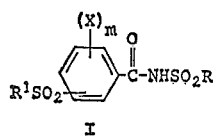

I wherein R is alkyl, for example, lower alkyl such as methyl, ethyl, n-propyl, isopropyl, n-butyl, isobutyl, tertiary butyl, pentyl, isopentyl, heptyl, hexyl, octyl and the like, cycloalkyl, for example, mononuclear cycloalkyl containing from 5–6 carbon atoms such as cyclopentyl, cyclohexyl and the like, alkenyl, for example, lower alkenyl such as ethenyl, allyl and the like, aryl, for example, mononuclear aryl such as phenyl and the like, aralkyl, for example, mononuclear aralkyl such as benzyl and the like, halo substituted alkenyl, for example, 3-chloro-2-methylprop-1-enyl and the like; $R^1$ is alkyl, for example, straight or branched chain alkyl such as n-pentyl, 3-pentyl, 3-methyl-3-pentyl, 2-hexyl, 4-heptyl, 3-heptyl, 4-heptyl, 1,6-dimethyloctyl and the like, cycloalkyl, for example, mononuclear and polynuclear lower cycloalkyl containing from 5–7 nuclear carbon atoms such as cyclopentyl, cyclohexyl, 2-norbornyl and the like, alkyl substituted cycloalkyl, for example, alkyl substituted mononuclear cyaloalkyl containing 5–6 nuclear carbon atoms such as 1-ethylcyclohexyl, 1-ethylcyclopentyl and the like, cycloalkylalkyl, for example, mononuclear cycloalkyl substituted lower alkyl such as cyclohexylmethyl, 1-cyclohexylethyl and the like, alkenyl, for example, lower alkenyl such as 1-methyl-2-butenyl and the like, alkynyl, for example, lower alkynyl such as 2-propynyl and the like or a 5- or 6-membered heterocyclic ring containing a single hetero atom selected from oxygen or nitrogen and bonded to the sulfonyl moiety via a nuclear carbon such as 2-furyl, 2-pyrrolidinyl, 2-pyridyl and the like or a primary or secondary amino radical of the formula:

wherein $Y^1$ is hydrogen, alkyl, for example, lower alkyl such as ethyl, n-propyl, isopropyl, n-butyl, isobutyl, pentyl, hexyl and the like, cycloalkyl, for example, mononuclear cycloalkyl containing from 5–6 nuclear carbon atoms such as cyclopentyl, cyclohexyl and the like; $Y^2$ is alkyl, for example, lower alkyl such as ethyl, n-propyl, n-butyl, pentyl, hexyl and the like or cycloalkyl, for example, mononuclear cycloalkyl containing from 5–6 nuclear carbon atoms such as cyclopentyl, cyclohexyl and the like and $Y^1$ and $Y^2$, taken together, may be joined with the nitrogen to which they are attached to form a saturated 5- or 6-membered heterocyclic ring such as pyrrolidinyl, morpholino, piperidino and the like; X is hydrogen, halo such as bromo, chloro, fluoro and the like, lower alkyl such as methyl, ethyl and the like, trihalomethyl such as trifluoromethyl and the like, nitro, carboxy, amino, alkylsulfonyl such as methylsulfonyl and the like or sulfamoyl and $m$ is an integer having a value of 1–4 and the non-toxic pharmaceutically acceptable salts thereof as, for exampe, organic and inorganic salts derived from alkali metal and alkaline earth metal bases such as sodium hydroxide, sodium bicarbonate, calcium carbonate, magnesium hydroxide and the like or salts derived from ammonia or from dialkylamines or heterocyclic amines such as dimethylamine, diethylamine, piperidine, pyrrolidine, pyridine, morpholine and the like.

A preferred embodiment of this invention is the N-organosulfonyl-4-(di - substituted sulfamoyl)benzamides having the following formula:

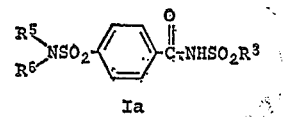

Ia wherein $R^3$ is alkyl, for example, lower alkyl such as methyl, ethyl, n-propyl, n-butyl and the like, cycloalkyl, for example, mononuclear cycloalkyl containing 5 to 6 carbon atoms such as cyclopentyl, cyclohexyl and the like and $R^5$ and $R^6$ are lower alkyl and the pharmaceutically acceptable salts thereof.

The nuclear sulfamoyl and nuclear sulfonyl substituted N-organosulfonyl benzamides of this invention are conveniently prepared by treating a nuclear sulfamoyl or nuclear sulfonyl substituted benzoyl halide with either an organosulfonamide or the alkali metal salt of an organosulfonamide. The temperature at which the reaction is conducted is not a critical aspect of this invention and, therefore, the reaction may be conveniently conducted at a temperature in the range of from about ambient temperaure up to the boiling point of the particular solvent being employed. Any solvent which is substantially inert to the reactants may be employed such as pyridine, acetone, a mixture of triethylamine and acetone and the like. The following equation illustrates this process:

wherein R, R¹, X and $m$ are as defined above and Z is hydrogen or the cation derived from an alkali metal such as sodium, potassium and the like X¹ is halo such as chloro and the like.

The organosulfonamides employed as reactants in the foregoing process are either known compounds or may be prepared by methods known to those skilled in the art. For example, the corresponding appropriately substituted sulfonic acid is treated with a halogenating agent such as thionyl chloride to afford the corresponding sulfonyl chloride which, by treatment with ammonia, affords the desired organosulfonamide. The following equation illustrates this process:

wherein R is as defined above.

The nuclear sulfamoyl and nuclear sulfonyl substituted benzoyl halides (II, supra) are conveniently prepared by treating a nuclear sulfamoyl or nuclear sulfonyl substituted benzoic acid (III, infra) with a halogenating agent such as thionyl chloride, thionyl bromide and the like. The following equation illustrates this process:

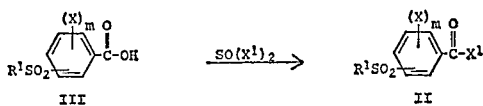

wherein R¹, X, X¹ and $m$ are as defined above.

The nuclear sulfamoyl and nuclear sulfonyl substituted benzoic acids (III, supra) employed in the preparation of the nuclear sulfamoyl and nuclear sulfonyl substituted benzoyl halides (II, supra) are prepared by either of several methods depending upon the nature of the R¹ group. One method wherein R¹ is a primary or secondary amino radical comprises treating a halosulfonylbenzoic acid with a suitable amine. The second method, wherein R¹ is alkyl, cycloalkyl, alkenyl or alkynyl, comprises the oxidation of a nuclear thio substituted benzoic acid or a nuclear sulfinyl substituted benzoic acid.

The first method used for preparing the nuclear sulfamoyl substituted benzoic acids comprises the reaction of a halosulfonylbenzoic acid (IV, infra) with a suitable amine of the formula:

wherein Y¹ and Y² are as defined above. Any solvent which is substantially inert to the reactants may be employed as, for example, acetone, benzene, pyridine and the like; however, it is preferred to use as the solvent an excess of the amine which is employed as the starting material in the process. The temperature at which the reaction is conducted is not critical but, in general, it is most desirable to conduct the process at a temperature in the range of from about 25° C. to 100° C. The following equation illustrates this process

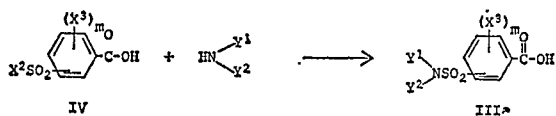

wherein $m$, Y¹ and Y² are defined above and X² is halo such as bromo, chloro and the like and X³ is hydrogen, halo, trihalomethyl, lower alkyl, nitro, hydroxy, carboxyl or alkylsulfonyl.

Those compounds corresponding to Formula III, supra, wherein R¹ is alkyl, cycloalkyl, alkenyl or alkynyl are obtained by treating the corresponding nuclear sulfinyl substituted benzoic acid (V, infra) with an oxidizing agent. The following equation illustrates this process:

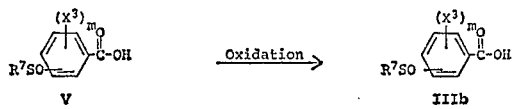

wherein X³ and $m$ are as defined above and R⁷ is alkyl, cycloalkyl, alkenyl or alkynyl. In lieu of the nuclear sulfinyl substituted benzoic acid precursor (V, supra), it is also possible to employ the nuclear thio substituted benzoic acid (VI, infra). According to this method of preparation, the nuclear thio substituted benzoic acid reactant (VI) is first oxidized to the nuclear sulfinyl substituted benzoic acid (V, infra) via treatment with a stoichiometric amount of oxidizing agent and then to the desired nuclear sulfonyl substituted benzoic acid (IIIb) with additional oxidizing agent. The following equation illustrates this process:

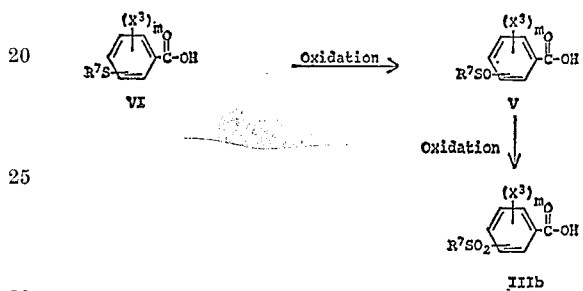

where X³, $m$ and R⁷ are as defined above. Oxidizing agents which are suitable for use in both oxidation steps include hydrogen peroxide, chromium trioxide, potassium permanganate and the like. Any solvent in which the reactants are reasonably soluble and substantially inert may be employed, such as acetic acid, acetone and the like. The temperature at which the reaction is conducted is not particularly critical and, in general, temperatures in the range of from about 0° C. to about 100° C. are suitable; however, it is convenient to conduct the reaction at temperatures in the range of from about 0° C. to room temperature and preferably at 0° C.

When the compound (IIIb) obtained according to the foregoing method is a nuclear mono-nitro or di-nitro-substituted nuclear sulfamoyl substituted benzoic acid, said derivative may be converted to the corresponding nuclear amino, halosulfonyl or sulfamoyl-substituted product by one of the following methods.

The nuclear sulfamoyl substituted aminobenzoic acids (IIIb, infra) are conveniently prepared by catalytic hydrogenation of the corresponding nuclear nitro-substituted nuclear sulfamoyl substituted benzoic acid (IIIc, infra) with a catalyst such as platinum oxide, Raney catalyst alloy in the presence of sodium hydroxide and the like. Although the temperature at which the reaction is conducted is not critical, it is conveniently conducted at ambient temperatures. The following equation illustrates the process wherein there is one nitro substituent; however, it should be understood that the (mono- or di-substituted sulfamoyl)-2,3-di-nitrobenzoic acids may be substituted therefor to afford the corresponding 2,3-diamino substituted product:

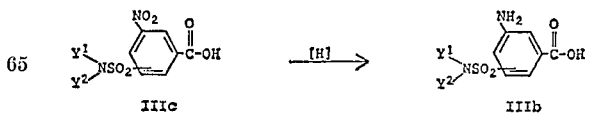

wherein Y¹ and Y² are as defined above.

The nuclear sulfamoyl substituted aminobenzoic acids (IIIb, supra) obtained according to the foregoing procedure may be converted to the corresponding nuclear halosulfonyl-substituted sulfamoylbenzoic acids (IIId, infra) by treatment with an aqueous solution of sodium nitrite and an acid such as hydrochloric acid, perchloric acid or fluoroboric acid to form the corresponding diazonium salt followed by treating said diazonium salt with a solution of sulfur dioxide and a cuprous halide such as cuprous chloride, cuprous bromide or cuprous fluoride and the like in water or in a lower alkanoic acid such as acetic acid and the like. The reaction may be conducted at temperatures in the range of from about 0° C. up to about 25° C.; however, it is preferred to conduct the process at a temperature range of from about 0° C. to about 5° C. The following equation illustrates the process wherein there is one amino substituent, but the nuclear sulfamoyl substituted 2,3-diaminobenzoic acids may be substituted therefor to afford the corresponding 2,3-dihalosulfonylbenzoic acid:

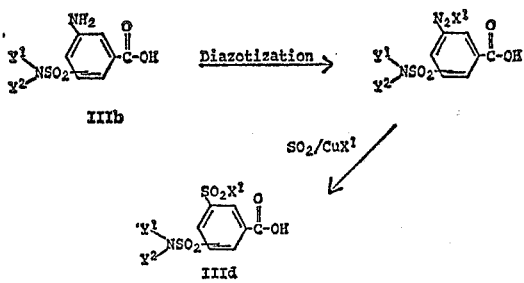

wherein $Y^1$, $Y^2$ and $X^1$ are as defined above.

The nuclear halosulfonyl-substituted sulfamoylbenzoic acids (IIId, supra) may be converted to their corresponding nuclear sulfamoyl-substituted benzoic acids (IIIe, infra) by treatment with ammonia. The following equation illustrates the process wherein there is one halosulfonyl substituent, but the 2,3-di-halosulfonylbenzoic acids will afford the corresponding 2,3-disulfamoyl substituted product:

wherein $Y^1$, $Y^2$ and $X^1$ are as defined above.

The halosulfonylbenzoic acids (IV, supra) are either known compounds or may be prepared by either of several methods. One method comprises treating a suitable benzoic acid (VII, infra) with a halosulfonic acid. A second method comprises diazotizing an appropriate nuclear amino substituted benzoic acid (VIII, infra) to form the corresponding diazonium salt followed by treating said salt with sulfur dioxide and a cuprous halide.

The first of the above-mentioned processes comprises treating a suitable benzoic acid (VII, infra) with a halo sulfonic acid such as chloro sulfonic acid, flouorosulfonic acid and the like. This reaction is conducted by adding the benzoic acid to the halosulfonic acid at room temperature and, when the addition is complete, warming the reaction mixture to facilitate completion of the reaction. The following equation illustrates this process:

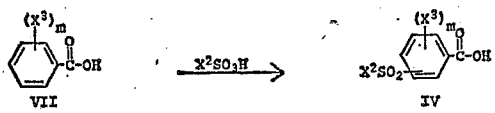

wherein $X^2$, $X^3$ and $m$ are as defined above.

A second method comprises treating an appropriate nuclear amino substitutued benzoic acid (VIII, infra) with an aqueous solution of sodium nitrite in an acid such as hydrochloric acid and the like to form the corresponding diazonium salt followed by treatment of the said salt with a solution of sulfur dioxide and a cuprous halide such as cuprous chloride and the like in a suitable solvent such as water or a lower alkanoic acid such as acetic acid and the like. The reaction may be conducted at temperatures in the range of from about 0° C. up to about 25° C. The following equation illustrates this process:

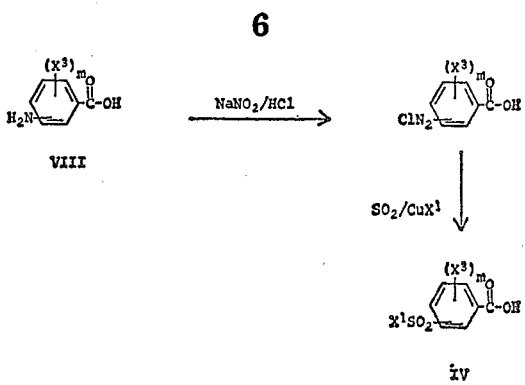

wherein $X^1$, $X^3$ and $m$ are as defined above.

The nuclear thio substituted benzoic acids (VI, infra) are conveniently prepared by either of two alternative methods. One such method comprises treating the alkali metal salt of a suitable mercaptobenzoic acid (IX, infra) with an organohalide of the formula: $X^1R^7$ wherein $R^7$ and $X^1$ are as defined above. Any solvent in which the reactants are soluble and which are inert to the reactants employed may be used. Typical of such solvents are ethanol, benzene, toluene and the like. While the temperature at which the reaction is conducted is not a particularly critical aspect of this invention, we have found it convenient to conduct the reaction at temperatures ranging from ambient temperature up to the reflux temperature of the solvent employed. The following equation illustrates this process:

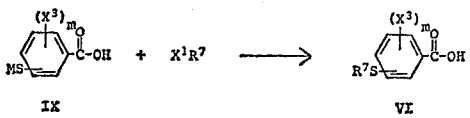

wherein $R^7$, $X^2$, $X^3$ and $m$ are as defined above and M is a cation derived from an alkali metal such as sodium and the like.

A second method of preparation and one which is limited to the synthesis of 4-thiobenzoic acids (VIa, infra) wherein the benzene nucleus is substituted in the 3-position by a strong electron attracting group such as nitro, carboxy, sulfamoyl and the like, comprises treating a corresponding 4 - halobenzoic acid (X, infra) with a compound of the formula: $MSR^7$ wherein $R^7$ and M are as defined above. Solvents which may be employed are the alkanols, for example, the lower alkanols such as ethanol and the like. Also, it is convenient to add the alkali metal salt of the mercaptan reactant to the 4-halobenzoic acid (X) at a temperature of about 0° C. and then increasing the temperature up to the reflux temperature of the solvent system employed. The following equation illustrates this process:

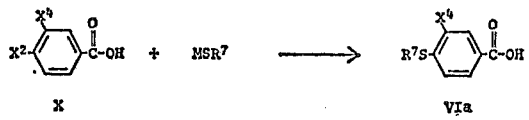

wherein $R^7$, M, $X^2$ and $m$ are as defined above and $X^4$ is a strong electron attracting group such as nitro, carboxy, sulfamoyl and the like.

The alkali metal salts of the mercaptobenzoic acid reactants (IX, supra) are prepared by treating the corresponding mercaptobenzoic acid (XI, infra) with a suitable base as, for example, with an alkali metal alkoxide or an alkali metal hydride such as sodium ethoxide or sodium hydride and the like. When an alkoxide is employed, it is most convenient to employ, as the solvent, an alkanol which corresponds to the alkoxide portion of the alkali metal alkoxide, whereas, when an alkali metal hydride is employed it is most advantageous to use hydrocarbon solvents such as benzene, toluene and the like. This reaction is conveniently conducted at the reflux temperature of the solvent employed. The following equation illustrates this process:

wherein M, $X^3$ and $m$ are as defined above.

The mercaptobenzoic acids (XI, supra) employed in the preparation of the alkali metal salts of the mercaptobenzoic acids (IX, supra) are either known compounds or are prepared by treating a suitable halosulfonylbenzoic acid (IV, infra) with a reducing agent such as zinc amalgam, zinc dust or stannous chloride. The reaction is preferably conducted in an aqueous solution of a mineral acid such as hydrochloric acid, sulfuric acid and the like or in a lower alkanoic acid such as acetic acid and the like. The following equation illustrates this process:

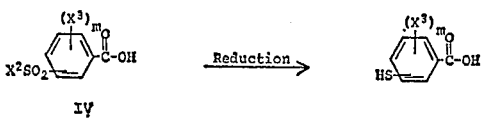

wherein $X^2$, $X^3$ and $m$ are as defined above.

Included within the scope of this invention are the non-toxic, pharmaceutically acceptable salts of the instant products. In general, any base which will form a salt with the nuclear sulfamoyl (and nuclear sulfonyl) substituted N-organosulfonylbenzamides and whose pharmacological properties will not cause an adverse physiological effect when ingested by the body system, is considered as being within the scope of this invention. Suitable bases for preparing the salts include, for example, the alkali metal and alkaline earth metal hydroxides, alkoxides and carbonates, metal hydrides, ammonia, secondary amines or heterocyclic amines and the like.

The examples which follow illustrate the nuclear sulfamoyl and nuclear sulfonyl substituted N-organosulfonylbenzamides (I) of this invention and the methods by which they may be prepared. However, the examples are illustrative only and it will be apparent to those having ordinary skill in the art that all of the products embraced by Formula I, supra, may also be prepared in an analogous manner by substituting the appropriate starting materials for those set forth in the examples.

EXAMPLE 1

N-n-butanesulfonyl-4-di-n-propylsulfamoylbenzamide

Step A: 4-di-4-propylsulfamoylbenzoyl chloride.—A mixture of 4-di-n-propylsulfamoylbenzoic acid (100 g., 0.35 mole) and thionyl chloride (200 ml.) is heated on the steam bath under reflux for 2 hours. The excess thionyl chloride is removed under reduced pressure. The residue is recrystallized from hexane to afford 102 g. of 4-di-n-propylsulfamoylbenzoyl chloride, M.P. 61°–63° C.

Step B: N - n - butanesulfonyl-4-di-n-propylsulfamoyl-benzamide.—n-Butanesulfonamide (6.9 g., 0.05 mole) is dissolved in dry pyridine (50 ml.). To this solution is added 4-di-n-propylsulfamoylbenzoyl chloride (15.2 g., 0.05 mole). The reaction mixture is cooled and stirred during the addition after which it is heated for one hour on the steam bath. The excess solvent is removed under reduced pressure, the residue is poured into water and the mixture is acidified with dilute hydrochloric acid. The solid residue is suspended in a dilute sodium bicarbonate solution, the insoluble material is removed by filtration and the product is recovered by careful acidification of the filtrate with dilute hydrochloric acid. The crude product is recrystallized by dissolving it in ether and adding hexane to induce crystallization to afford 7.3 g. of substantially pure N - n - butanesulfonyl-4-di-n-propylsulfamoylbenz-amide, M.P. 123°–125° C.

Elemental analysis for $C_{17}H_{28}N_2O_5S_2$ (percent): Calc.: C, 50.47; H, 6.98; N, 6.93. Found (percent): C, 50.49; H, 7.00; N, 6.87.

EXAMPLE 2

N-cyclohexanesulfonyl-4-di-n-propylsulfamoylbenzamide

By substituting an equimolar quantity of cyclohexanesulfonamide for the butanesulfonamide of Example 1, Step B, and by following the procedure described therein, there is obtained 6.7 g. of N-cyclohexanesulfonyl-4-di-n-propylsulfamoylbenzamide, M.P. 131°–133° C.

Elemental analysis for $C_{19}H_{30}N_2O_5S_2$ (percent): Calc.: C, 53.00; H, 7.05; N, 6.51. Found (percent): C, 52.80; H, 6.97; N, 6.43.

EXAMPLE 3

N-methanesulfonyl-4-di-n-propylsulfamoylbenzamide

Methanesulfonamide (5.1 g., 0.055 mole) is suspended in dry benzene (100 ml.). Sodium hydride (2.3 g. of a 58.9% suspension in mineral oil; 0.055 mole) is added, in several portions, with good stirring. When addition is complete, the reaction mixture is warmed on the steam bath for one half hour whereupon a gelatinous mixture is formed. A solution of 4-di-n-propylsulfamoylbenzoyl chloride (15 g., 0.05 mole) in dry benzene (50 ml.) is added, slowly, dropwise with good stirring, over a period of about 15 minutes. The reaction mixture is then heated under reflux for one hour, then excess solvent is distilled. The residue is dissolved in ether and the product is extracted into a sodium bicarbonate solution from which it is recovered by careful acidification with dilute hydrochloric acid. Recrystallization from ether affords 6.7 g. of N - methanesulfonyl - 4-di-n-propylsulfamoylbenzamide, M.P. 147.5°–149° C.

Elemental analysis for $C_{14}H_{22}N_2O_5S_2$ (percent): Calc.: C, 46.39; H, 6.12; N, 7.73. Found (percent): C, 46.81; H, 5.96; N, 7.66.

EXAMPLE 4

N-cyclopentanesulfonyl-3-chloro-4-(4-heptylsulfonyl) benzamide

Step A: 3 - chloro - 4 - chlorosulfonylbenzoic acid.—3-chlorobenzoic acid (156.0 g., 1.0 mole) is added to chlorosulfonic acid (330 ml.). After heating at 60°–65° C. for two hours, the solution is cooled and poured onto crushed ice to yield crude 3-chloro-4-chlorosulfonylbenzoic acid, M.P. 151°–153° C.

Step B: 3-chloro-4-mercaptobenzoic acid.—To a suspension of 3-chloro-4-chlorosulfonylbenzoic acid (12.8 g., 0.05 mole) in a solution of sulfuric acid (62 ml.) and water (125 ml.) is added zinc amalgam. [The zinc amalgam is prepared by dissolving mercuric chloride (7.5 g.) in a solution of water (125 ml.) and hydrochloric acid (5 ml.) followed by the addition of zinc dust (37.5 g.). The mixture is stirred for 15 minutes and then filtered. The zinc amalgam is washed successively with water, ethanol and finally diethyl ether.] After the addition of the zinc amalgam, the reaction mixture is warmed on a steam bath for 3 hours. The reaction mixture is cooled and extracted with three 300 ml. portions of ether. The ether extract is dried over sodium sulfate, filtered and the filtrate concentrated to about 50 ml. to obtain crude 3 - chloro - 4 - mercaptobenzoic acid. The product is recrystallized from ether to obtain substantially pure 3-chloro-4-mercaptobenzoic acid, M.P. 240°–245° C.

Step C: 3-chloro-4-(4-heptylthio)benzoic acid.—A solution of sodium ethoxide in ethanol is prepared by adding 2.3 g. (0.1 g. atom) of sodium to 100 ml. of ethanol. To this solution is added 9.9 g. (0.052 mole) of 3-chloro-4-mercaptobenzoic acid. The resulting suspension is heated on the steam bath, under reflux, for ¼ hour. Heating is then discontinued while 18 g. (0.1 mole) of 4-bromoheptane is added slowly through a dropping funnel after which it is again heated under reflux for an additional 2 hours. After removal of about ½ the solvent, the residue is cooled and water is added. The excess bromide is removed by extraction with ether and the product is precipitated from the aqueous phase by acidification with dilute hydrochloric acid to afford 3-chloro-4-(4-heptylthio)benzoic acid, M.P. 93°–95° C.

*Elemental analysis* for $C_{14}H_{19}ClO_2S$ (percent): Calc.: C, 58.62; H, 6.68. Found (percent): C, 58.55; H, 6.62.

Step D: 3-chloro-4-(4-heptylsulfonyl)benzoic acid.— A suspension of 3-chloro-4-(4-heptylthio)benzoic acid (0.025 mole) in a mixture of 25 ml. of glacial acetic acid and 25 ml. of acetic anhydride is cooled to about 0° C. To this is added, dropwise, 9.1 g. (0.08 mole) of 30% hydrogen peroxide, over a period of ½ hour. The reaction is stirred while the ice bath melts and the reaction is allowed to come to room temperature. During this time the solution is cleared. The reaction is allowed to stand overnight at room temperature. When the reaction is poured onto crushed ice, there is obtained 3-chloro-4-(4-heptylsulfonyl)benzoic acid, M.P. 81–83° C.

*Elemental analysis* for $C_{14}H_{19}ClO_4S$ (percent): Calc.: C, 52.74; H, 6.01. Found (percent): C, 52.85; H, 5.93.

Step E: 3-chloro - 4 - (4-heptylsulfonyl)benzoyl chloride.—By substituting 3 - chloro - 4 - (4-heptylsulfonyl)benzoic acid for the 4-di-n-propylsulfamoylbenzoic acid of Example 1, Step A, and by following substantially the procedure described therein, there is obtained 3-chloro-4-(4-heptylsulfonyl)benzoyl chloride.

Step F: N-cyclopentanesulfonyl-3-chloro-4-(4-heptylsulfonyl)benzamide.—By substituting cyclopentanesulfonamide and 3-chloro-4-(4-heptylsulfonyl)benzoyl chloride for the butanesulfonamide and 4-di-n-propylsulfamoylbenzoyl chloride of Example 1, Step B, and following the procedure described therein, there is obtained N-cyclopentanesulfonyl-3-chloro-4-(4 - heptylsulfonyl)benzamide.

EXAMPLE 5

N-ethanesulfonyl-4-chloro-3-(4-heptylsulfonyl)benzamide

Step A: 4 - chloro - 3 - chlorosulfonylbenzoic acid.— 4-chlorobenzoic acid (1.0 mole) is added to chlorosulfonic acid (330 ml.). After heating at 60°–65° C. for two hours, the solution is cooled and poured onto crushed ice to yield crude 4-chloro-3-chlorosulfonylbenzoic acid.

Step B: 4-chloro-3-mercaptobenzoic acid.—To a suspension of 4-chloro-3-chlorosulfonylbenzoic acid (25.5 g., 0.1 mole) in a solution of sulfuric acid (125 ml., concentrated) and water (125 ml.) is added zinc amalgam. [The zinc amalgam is prepared by dissolving mercuric chloride (15.0 g.) in a solution of water (250 ml.) and concentrated hydrochloric acid (10 ml.) followed by the addition of zinc dust (75.0 g.). The reaction mixture is stirred for 10 minutes and then filtered. The zinc amalgam is washed successively with water (2.0 liters), ethanol and, finally, diethyl ether.] After the addition of the zinc amalgam the reaction mixture is heated on a steam bath with stirring for 4 hours. The reaction mixture is cooled and extracted with four 500 ml. portions of diethyl ether. The ether extract is dried over sodium sulfate, filtered and the filtrate concentrated to about 100–150 ml. to afford 14.5 g. of 4-chloro-3-mercaptobenzoic acid, M.P. 218°–222° C.

Step C: 4-chloro-3-(4-heptylthio)benzoic acid.—A solution of sodium ethoxide in ethanol is prepared by adding sodium (1.84 g., 0.08 mole) to ethanol (75 ml.). To this solution is added 4-chloro-3-mercaptobenzoic acid (7.5 g., 0.04 mole). The reaction mixture is refluxed for ¼ hour. 4-bromoheptane (14.3 g., 0.08 mole) is added slowly to the reaction mixture. When the addition is complete, the reaction mixture is again heated under reflux for an additional 2 hours. The reaction mixture is concentrated under vacuum and water (150 ml.) is added. The reaction mixture is extracted with ether and the product is precipitated from the aqueous phase by acidification with dilute hydrochloric acid to afford 9.2 g. of crude product, M.P. 62°–64° C. Recrystallization from ether yields substantially pure 4-chloro-3-(4-heptylthio)benzoic acid, M.P. 64°–66° C.

*Elemental analysis* for $C_{14}H_{19}ClO_2S$ (percent): Calc. C, 58.62; H, 6.68. Found (percent): C, 58.38; H, 6.95.

Step D: 4-chloro-3-(4-heptylsulfonyl)benzoic acid.— A solution of 4-chloro-3-(4-heptylthio)benzoic acid (8.2 g., 0.0286 mole) in a mixture of glacial acetic acid (5.0 ml.) and acetic anhydride (5.0 ml.) is cooled to 0° C. Hydrogen peroxide (9.2 g., 0.09 mole) is added dropwise to the reaction mixture. The reaction mixture is stirred while the ice bath melts and the reaction mixture is then allowed to come to room temperature. The reaction mixture is diluted with water to afford an oily product which is extracted with ether and then extracted from the ether phase with an aqueous sodium bicarbonate solution. The bicarbonate solution containing the product is acidified with dilute hydrochloric acid and the product again extracted with ether. Removal of the ether again affords an oil which slowly crystallizes. Several recrystallizations from cyclohexane affords pure 4-chloro-3-(4-heptylsulfonyl)benzoic acid, M.P. 108°–110° C.

*Elemental analysis* for $C_{14}H_{19}ClO_4S$ (percent): Calc.: C, 52.74; H, 6.01. Found (percent): C, 52.63; H, 6.01.

Step E: 4-chloro - 3 - (4-heptylsulfonyl)benzoyl chloride.—By substituting 4-chloro-3-(4-heptylsulfonyl)benzoic acid for the 4-di-n-propylsulfamoylbenzoic acid of Example 1, Step A, and by following substantially the procedure described therein, there is obtained 4-chloro-3-(4-heptylsulfonyl)benzoyl chloride.

Step F: N-ethanesulfonyl-5-chloro-3-(4-heptylsulfonyl)benzamide.—By substituting ethane sulfonamide and 4-chloro-3-(4-heptylthio)benzoyl chloride for the butane sulfonamide and 4-di-n-propylsulfamoylbenzoyl chloride of Example 1, Step D, and following substantially the procedure described therein, there is obtained N-ethanesulfonyl-5-chloro-3-(4-heptylsulfonyl)benzamide.

EXAMPLE 6

N-allylsulfonyl-2-(4-heptylsulfonyl)benzamide

Step A: 2-(4-heptylthio)benzoic acid.—A solution of sodium ethoxide in ethanol is prepared by adding sodium (1.15 g., 0.05 gram atom) to ethanol (50 ml.). To this solution is added thiosalicylic acid (4.0 g., 0.02 mole). 4-bromoheptane (7.2 g., 0.04 mole) is then added and the reaction mixture is refluxed for 2 hours. The reaction mixture is concentrated to about ½ of its original volume and poured into water. Acidification with dilute hydrochloric acid affords crude product which is extracted with ether. The ether extract is extracted with an aqueous solution of sodium bicarbonate and the aqueous bicarbonate extract is acidified with dilute hydrochloric acid. The oil which precipitates is extracted with ether and the ether extract dried over sodium sulfate. The ether solution is filtered and the ether removed. The remaining oil is vacuum distilled to yield substantially pure 2-(4-heptylthio)benzoic acid, B.P. 175°–178° C./0.7 mm.

*Elemental analysis* for $C_{14}H_{20}O_2S$ (percent): Calc.: C, 66.63; H, 7.98. Found (percent): C, 66.31; H, 8.01.

Step B: 2-(4-heptylsulfonyl)benzoic acid.—To a solution of 2-(4-heptylthio)benzoic acid in a mixture of glacial acetic acid (15.0 ml.) and acetic anhydride (15.0 ml.) at 0° C. is slowly added hydrogen peroxide (5.0 g., 0.08 mole). The reaction mixture is stirred at 0° C. for one hour and allowed to come to room temperature. The reaction mixture is poured into water and the crude product extracted with ether. The ether extract is dried over sodium sulfate, filtered and the ether removed by distillation to afford crude product which is purified by recrystallization from hexane to afford substantially pure 2-(4-heptylsulfonyl)benzoic acid, M.P. 77°–79° C.

*Elemental analysis* for $C_{14}H_{20}O_4S$ (percent): Calc.: C, 59.14; H, 7.09. Found (percent): C, 59.36; H, 7.10.

Step C: 2-(4-heptylsulfonyl)benzoyl chloride.—By substituting for the 4-di-n-propylsulfamoylbenzoic acid of Example 1, Step A, for 2-(4-heptylsulfonyl)benzoic acid and following substantially the procedure described therein, there is obtained 2-(4-heptylsulfonyl)benzoyl chloride.

Step D: N-allylsulfonyl - 2 - (4-heptylsulfonyl)benzamide.—By substituting allylsulfonamide and 2-(4-heptylsulfonyl)benzoyl chloride for the n-butanesulfonamide and 4-di-n-propylsulfamoylbenzoyl chloride of Example 1, Step B, and following substantially the procedure described therein, there is obtained N-allylsulfonyl-2-(4-heptylsulfonyl)benzamide.

EXAMPLE 7

N-methanesulfonyl-2,3-dichloro-4-di-n-propylsulfamoylbenzamide

Step A: 2,3-dichloro-4-acetamidobenzoic acid.—A suspension of 2-chloro-4-acetamidobenzoic acid (32.0 g.) in acetic acid (300 ml.) is stirred while chlorine is passed into the mixture at 25°–30° C. for 2 hours. During the first hour, the suspension becomes clear, after which the products begins to crystallize. The product is collected by filtration and is washed successively with a small amount of acetic acid and water and then air dried to afford 9.5 g. of 2,3-dichloro-4-acetamidobenzoic acid, M.P. 201°–203° C.

Step B: 2,3-dichloro-4-aminobenzoic acid.—2,3-dichloro-4-acetamidobenzoic acid (6.0 g.) is dissolved in 5% sodium hydroxide (40 ml.) and is heated at 90° C. for 3 hours. The reaction mixture is cooled and is acidified with dilute hydrochloric acid. The crude product obtained is recrystallized from 50% aqueous alcohol to afford 2,3-dichloro-4-aminobenzoic acid, M.P. 229°–231° C.

Step C: 2,3-dichloro - 4 - di-n-propylsulfamoylbenzoic acid.—A suspension of 2,3-dichloro-4-aminobenzoic acid (12.4 g.) in acetic acid (30 ml.) and concentrated hydrochloric acid (15 ml.) is cooled and stirred while a solution of sodium nitrite (4.2 g.) in water (10 ml.) is added, slowly, dropwise, at such a rate that the temperature does not exceed 5° C. Meanwhile, 30 g. of sulfur dioxide is dissolved in acetic acid (60 ml.). To this is added cupric chloride (8.0 g.) in water (15 ml.). The diazonium chloride is then added to the sulfur dioxide solution. After standing for an hour, the product is collected by filtration. The 2,3-dichloro - 4 - chlorosulfonylbenzoic acid is added to di-n-propylamine (50 ml.). After the initial vigorous reaction, the reaction mixture is allowed to stand for an hour and is then poured into water and acidified with dilute hydrochloric acid to afford 2,3-dichloro-4-di-n-propylsulfamoylbenzoic acid which, after recrystallization from an ether-hexane mixture, has a melting point of 156°–158° C.

Elemental analysis for $C_{13}H_{17}Cl_2NO_4S$ (percent): Calcd.: C, 44.07; H, 4.84; Cl, 20.02; N, 3.95. Found (percent): C, 44.53; H, 4.72; Cl, 19.61; N, 3.91.

Step D: 2,3 - dichloro-4-di-n-propylsulfamoylbenzoyl chloride.—By substituting 2,3 - dichloro-4-di-n-propylsulfamoylbenzoic acid for the 4-di-n-propylsulfamoylbenzoic acid of Example 1, Step A, and following substantially the procedure described therein, there is obtained 2,3-dichloro-4-di-n-propylsulfamoylbenzoyl chloride.

Step E: N-methanesulfonyl-2,3-dichloro-4-di-n-propylsulfamoylbenzamide.—By substituting for the 4-di-n-propylsulfamoylbenzoyl chloride of Example 3 an equimolar quantity of 2,3 - dichloro-4-di-n-propylsulfamoylbenzoyl chloride and following substantially the procedure described therein, there is obtained the N-methanesulfonyl-2,3-dichloro-4-di-n-propylsulfamoylbenzamide.

EXAMPLE 8

N-(2-butenylsulfonyl)-4-di-n-propylsulfamoyl-3-methylbenzamide

Step A: 4-di-n-propylsulfamoyl-3-methylbenzoic acid.—A suspension of 4-amino-3-methylbenzoic acid (15.1 g., 0.1 mole) in acetic acid (50 ml.) and hydrochloric acid (25 ml.) is stirred and cooled to 0° C. A solution of sodium nitrite (6.9 g.) in water (10 ml.) is added, slowly, dropwise, at such a rate that the temperature never exceeds 5° C. At the same time 30 g. of sulfur dioxide is dissolved in acetic acid (75 ml.) and cupric chloride (7.0 g.) in water (10 ml.) is added. The diazonium salt then is added to the sulfur dioxide solution as fast as foaming allows. After standing for 2 hours the reaction mixture is poured into a liter of ice water and filtered. The crude residue is added to di-n-propylamine (50.0 ml.). After half an hour, the excess amine is removed under reduced pressure, the residue is dissolved in a solution of dilute sodium hydroxide and the product is reprecipitated by acidification with dilute hydrochloric acid to afford 4.5 g. of 4-di-n-propylsulfamoyl-3-methylbenzoic acid, which after several recrystallizations from ethanol has an M.P. of 194°–196° C.

Elemental analysis for $C_{14}H_{21}NO_4S$ (percent): Calc.: C, 55.16; H, 7.07; N, 4.68. Found (percent): C, 56.22; H, 6.76; N, 4.60.

Step B: 4-di-n-propylsulfamoyl-3-methylbenzoyl chloride.—By substituting for the 4-di-n-propylsulfamoylbenzoic acid of Example 1, Step 9, an equimolar quantity of 4-di-n-propylsulfamoyl-3-methylbenzoic acid and following substantially the procedure described therein, there is obtained 4 - di-n-propylsulfamoyl-3-methylbenzoyl chloride.

Step C: N - (2-butenylsulfonyl)-4-di-n-propylsulfamoyl-3-methylbenzamide.—By substituting 2-butenylsulfonamide and 4-di-n-propylsulfamoyl-3-methylbenzoyl chloride for the n-butanesulfonamide and 4-di-n-propylsulfamoylbenzoyl chloride of Example 1 Step B, and following substantially the procedure described therein, there is obtained N - (2-butenylsulfonyl)-4-di-n-propylsulfamoyl-3-methylbenzamide.

EXAMPLE 9

N-methanesulfonyl-4-di-n-propylsulfamoyl-3-nitrobenzamide

Step A: 4-di-n-propylsulfamoyl-3-nitrobenzoic acid.—By substituting an equivalent amount of 4-amino-3-nitrobenzoic acid for the 4-amino-3-methylbenzoic acid of Example 8, Step A, and following the procedure described therein, there is obtained 4-di-n-propylsulfamoyl-3-nitrobenzoic acid, M.P. 150°–152° C. resolidifying and remelting at 160°–162° C. after recrystallization from benzene.

Elemental analysis for $C_{13}H_{18}N_2O_6S$ (percent): Calc.: C, 47.26; H, 5.49; N, 8.48. Found (percent): C, 47.09; H, 5.30; N, 8.51.

Step B: 4 - di-n-propylsulfamoyl-3-nitrobenzoyl chloride.—By substituting for the 4-di-n-propylsulfamoylbenzoic acid of Example 1, Step A, an equimolar quantity of 4-di-n-propylsulfamoyl-3-nitrobenzoic acid and following substantially the procedure described therein, there is obtained 4-di-n-propylsulfamoyl-3-nitrobenzoyl chloride.

Step C: N-methanesulfonyl - 4-di-n-propylsulfamoyl-3-nitrobenzamide.—By substituting for the 4-di-n-propylsulfamoylbenzoyl chloride of Example 3 an equimolar quantity of 4-di-n-propylsulfamoyl-3-nitrobenzoyl chloride and following substantially the procedure described therein, there is obtained N-methanesulfonyl-4-di-n-propylsulfamoyl-3-nitrobenzamide.

EXAMPLE 10

N-propanesulfonyl-3-amino-4-di-n-propylsulfamoylbenzamide

Step A: 3-amino-4-di-n-propylsulfamoylbenzoic acid.—A solution of 4-di-n-propylsulfamoyl-3-nitrobenzoic acid in ethanol is shaken in an atmosphere of hydrogen in the presence of platinum oxide as a catalyst to afford 3-amino-4-di-n-propylsulfamoylbenzoic acid, M.P. 195°–197° C.

Elemental analysis for $C_{13}H_{20}N_2O_4S$ (percent): Calc.: C, 51.98; H, 6.71; N, 9.33. Found (percent): C 52.47; H, 6.60; N, 9.36.

Step B: 3 - amino-4-di-n-propylsulfamoylbenzoyl chloride.—By substituting for the 4-di-n-propylsulfamoylbenzoic acid of Example 1, Step A, an equimolar quantity of 3-amino-4-di-n-propylsulfamoylbenzoic acid and following substantially the procedure described therein, there is obtained 3-amino-4-di-n-propylsulfamoylbenzoyl chloride.

Step C: N-propanesulfonyl - 3-amino-4-di-n-propylsulfamoylbenzamide.—By substituting for the 4-di-n-propylsulfamoylbenzoyl chloride and the n-butanesulfonamide of Example 1, Step B, an equimolar quantity of 3-amino-4-di-n-propylsulfamoylbenzoic acid and propanesulfonamide and following substantially the procedure described therein, there is obtained N-propanesulfonyl-3-amino-4-di-n-propylsulfamoylbenzamide.

EXAMPLE 11

N-pentanesulfonyl-4-di-n-propylsulfamoyl-3-sulfamoylbenzamide

Step A: 4 - di-n-propylsulfamoyl-3-sulfamoylbenzoic acid.—A suspension of 3-amino-4-di-n-propylsulfamoylbenzoic acid (15.0 g.) in acetic acid (75 ml.) and hydrochloric acid (75 ml.) is cooled to 0° C. and stirred while a solution of sodium nitrate (3.5 g.) in water (10 ml.) is added, slowly, dropwise at such a rate that the temperature remains at less than 5° C. Meanwhile, 35 g. of sulfur dioxide is dissolved in acetic acid (70.0 ml.) and cupric chloride (3.0 g.) in water (10 ml.) is added. The diazonium salt then is added as fast as frothing allows. The reaction mixture is allowed to stand for 2 hours, the 4 - di-n-propylsulfamoyl-3-chlorosulfonylbenzoic acid is collected by filtration, washed with water and then added to liquid ammonia (50 ml.). The excess ammonia is allowed to evaporate and the residue is dissolved in water and acidified with dilute hydrochloric acid to afford 4-di-n-propylsulfamoyl - 3-sulfamoylbenzoic acid having an M.P. of 200°–201° C. after several recrystallizations from 30% aqueous alcohol.

Elemental analysis for $C_{13}H_{20}N_2O_6S_2$ (percent): Calc.: C, 42.84; H, 5.53; N, 7.69. Found (percent): C, 42.91; H, 5.52; N, 7.68.

Step B: 4-di-n-propylsulfamoyl - 3 - sulfamoylbenzoyl chloride.—By substituting for the 4-di-n-propylsulfamoylbenzoic acid of Example 1, Step A, an equimolar quantity of 4-di-n-propylsulfamoyl-3-sulfamoylbenzoic acid and following substantially the procedure described therein, there is obtained 4 - di-n-propylsulfamoyl - 3-sulfamoylbenzoyl chloride.

Step C: N-pentanesulfonyl-4-di-n-propylsulfamoyl-3-sulfamoylbenzamide.—By substituting for the 4-di-n-propylsulfamoylbenzoyl chloride and n-butanesulfonamide of Example 1, Step B, an equimolar quantity of 4-di-n-propylsulfamoyl - 3 - sulfamoylbenzoyl chloride and pentanesulfonamide, respectively, and following substantially the procedure described therein, there is obtained N-pentanesulfonyl - 4 - di - n - propylsulfamoyl - 3 - sulfamoyl benzamide.

EXAMPLE 12

N-methanesulfonyl-4-di-n-butylsulfamoyl benzamide

Step A: 4-di-n-butylsulfamoylbenzoyl chloride.—A mixture of 4-di-n-butylsulfamoylbenzoic acid (7.0 g.) and thionyl chloride (50 ml.) is heated on the steam bath under reflux for 2 hours. The excess thionyl chloride is removed under reduced pressure to afford a yellow oil which is dissolved in petether (100 ml.), filtered, and the resulting solution cooled whereupon the product precipitates. The product is collected on a Buchner to afford 5.2 g. of 4-di-n-butylsulfamoylbenzoyl chloride, M.P. 30°–32° C.

Elemental analysis for $C_{15}H_{22}ClNO_3S$ (percent): Calc.: C, 54.28; H, 6.68; N, 4.22. Found (percent): C, 54.16; H, 6.48; N, 4.23.

Step B: N-methanesulfonyl-4-di-n-butylsulfamoyl benzamide.—To a suspension of sodium hydride (0.65 g., 0.015 mole) in benzene (50 ml.) is added methanesulfonamide (5.0 g., 0.015 mole). The reaction mixture is heated under reflux with stirring for ½ hour. A solution of 4-di-n-butylsulfamoylbenzoyl chloride (1.42 g., 0.015 mole) in benzene (50 ml.) is then added. The reaction mixture is heated under reflux for an additional two hours and the benzene removed by distillation to afford a sticky residue which is dissolved in a saturated sodium bicarbonate solution which is then extracted with ether. The aqueous phase is separated and acidified with dilute hydrochloric acid to afford 4.5 g. of N-methanesulfonyl-4-di-n-butylsulfamoyl benzamide which, after recrystallization from ether, has a melting point of 135°–137° C.

Elemental analysis for $C_{16}H_{26}N_2O_5S_2$ (percent): Calc.: C, 49.21; H, 6.71; N, 7.17. Found (percent): C, 49.45; H, 6.57; N, 7.47.

In a manner similar to that described in Examples 4 and 7, all of the nuclear sulfamoyl (and nuclear sulfonyl) substituted N-organosulfonylbenzamides of this invention may be obtained.

Thus, by substituting the appropriately substituted mercaptobenzoic acid of Example 4, Step C, and following substantially the procedure described in Step C through Step F of that example the nuclear sulfonyl substituted N-organosulfonylbenzamides of this invention may be obtained. The following equation illustrates the reaction of Example 4, Steps C through F and, together with Table I, infra, depict the nuclear sulfonyl substituted N-organosulfonylbenzamides obtained thereby:

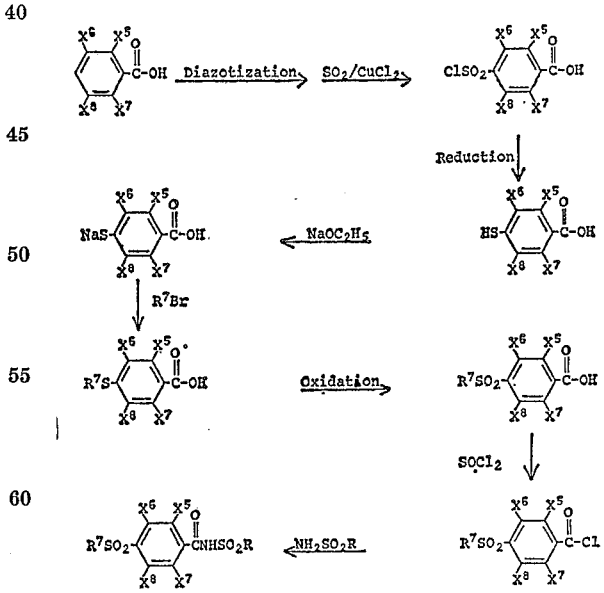

TABLE I

| Ex. No. | R | R⁷ | X⁵ | X⁶ | X⁷ | X⁸ |
|---|---|---|---|---|---|---|
| 13 | —CH₃ | —(CH₂)₄CH₃ | H | H | H | H |
| 14 | —⟨S⟩ | —CH(C₂H₅)₂ | H | H | H | H |
| 15 | —n-C₃H₇ | —C(CH₃)(C₂H₅)₂ | H | H | H | H |
| 16 | —CH(CH₃)₂ | $\underset{-(CH_2)_2\overset{|}{C}H(CH_2)_3CH(CH_3)_2}{CH_3}$ | H | H | H | H |

TABLE I—Continued

| Ex. No. | R | R⁷ | X⁵ | X⁶ | X⁷ | X⁸ |
|---|---|---|---|---|---|---|
| 17 | —CH₂CH(CH₃)₂ | (thiophene) | H | H | H | H |
| 18 | —C₂H₅ | (thiopyran) | H | H | H | H |
| 19 | —n-C₄H₉ | (cyclohexene) | H | H | H | H |
| 20 | —n-C₅H₉ | (ethyl-substituted thiopyran with C₂H₅) | H | H | H | H |
| 21 | —C₂H₅ | —CH₂CH=C(CH₃)₂ | H | H | H | H |
| 22 | —C₂H₅ | —CH₂C≡CCH₃ | H | H | H | H |
| 23 | —CH₃ | (furan) | Cl | Cl | Cl | Cl |
| 24 | —CH₃ | (thiazoline) | CH₃ | CH₃ | H | H |
| 25 | —CH₃ | (pyridine with H) | H | CF₃ | H | H |
| 26 | —n-C₃H₇ | —CH(n-C₃H₇)₂ | Cl | Cl | Cl | H |

In a manner similar to that described in Example 7, Steps B through E, all of the nuclear sulfamoyl substituted benzamides of this invention may be prepared. Thus, by substituting the appropriately substituted benzoic acid for the 2,3-dichloro-4-acetamidobenzoic acid recited in Example 7, Step B, the corresponding nuclear amino substituted benzoic acid is prepared which is converted to the desired nuclear sulfamoyl substituted benzamide by following the procedure as described in Steps C through E. The following equation and accompanying Table II illustrate the starting materials, intermediates and final products produced:

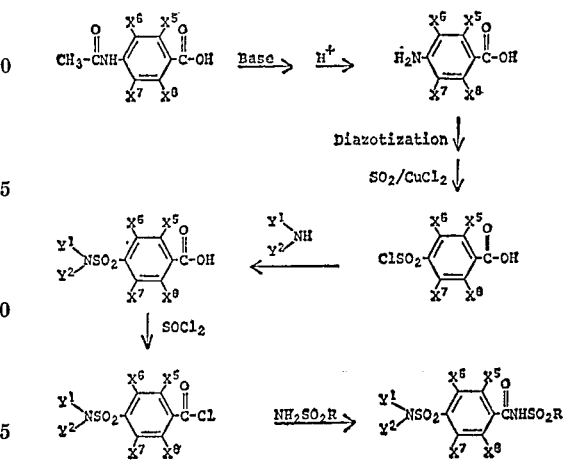

TABLE II

| Ex. No. | R | Y¹ | Y² | X⁵ | X⁶ | X⁷ | X⁸ |
|---|---|---|---|---|---|---|---|
| 27 | —C(CH₃)₃ | —n-C₃H₇ | —n-C₃H₇ | H | Cl | H | H |
| 28 | —C(CH₃)₂ | H | —n-C₃H₇ | H | H | H | H |
| 29 | —CH₂—⟨phenyl⟩ | —n-C₄H₉ | —n-C₄H₉ | H | H | H | H |
| 30 | ⟨phenyl⟩ | —n-C₅H₁₁ | —n-C₅H₁₁ | —CH₃ | —CH₃ | H | H |
| 31 | —CH=C(CH₃)CH₂Cl | ⟨thienyl-S⟩ | ⟨thienyl-S⟩ | —CH=CHCH=CH— | | | |
| 32 | —CH₂(CH₂)₆CH₃ | ⟨thienyl-S⟩ | ⟨thienyl-S⟩ | —CH₂CH₂CH₂CH₂— | | | |
| 33 | —CH₂(CH₂)₅CH₃ | —CH₂CH₂CH₂CH₂— | | H | —C(O)—OH | H | H |

TABLE II—Continued

| Ex. No. | R | Y¹ | Y² | X⁵ | X⁶ | X⁷ | X⁸ |
|---|---|---|---|---|---|---|---|
| 34 | $-CH_2(CH_2)_4CH_3$ |  | $-CH_2CH_2OCH_2CH_3-$ | H | $-CF_3$ | H | H |
| 35 | $-n-C_4H_9$ |  | $-CH_2CH_2CH_2CH_2CH_2-$ | H | Br | H | H |
| 36 | $-CH=CH_2$ | $-n-C_6H_{13}$ | $-n-C_6H_{13}$ | Cl | Cl | H | H |
| 37 | $-CH_2CH_2CH(CH_3)_2$ | $-C_2H_5$ | $-C_2H_5$ | Cl | Cl | H | H |
| 38 | $-CH_3$ | $-CH(CH_3)_2$ | $-CH(CH_3)_2$ | H | H | H | H |
| 39 | $-n-C_4H_9$ | $-CH_2CH(CH_3)_2$ | $-CH_2CH(CH_3)_2$ | H | H | H | H |

The novel compounds of this invention are uricosuric agents which can be administered in a wide variety of therapeutic dosages in conventional vehicles as, for example, by oral administration in the form of a tablet or by intravenous injection. Also, the daily dosage of the products may be varied over a wide range as, for example, in the form of scored tablets containing 5, 10, 25, 50, 100, 150, 250 and 500 milligrams of the active ingredient for the symptomatic adjustment of the dosage to the patient to be treated. These dosages are well below the toxic or lethal dose of the products which may be administered in a total daily dosage of from 100 mg. to 2,000 mg. in a pharmaceutically acceptable carrier.

A suitable unit dosage form of the products of this invention can be administered by mixing 50 milligrams of N-methanesulfonyl-4-di-n-propylsulfamoylbenzamide or a suitable salt with 149 mg. of lactose and 1 mg. of magnesium stearate and placing the 200 mg. mixture into a No. 2 gelatin capsule. Similarly, by employing more of the active ingredient and less lactose, other dosage forms can be put up in No. 2 gelatin capsules and, should it be necessary to mix more than 200 mg. of ingredients together, larger capsules may be employed. Compressed tablets, pills, or other desired unit dosages can be prepared to incorporate the compounds of this invention by conventional methods and, if desired, can be made up as elixirs or as injectable solutions by methods well known to pharmacists.

It is also within the scope of this invention to combine two or more of the compounds of this invention in a unit dosage form or to combine one or more of the compounds of this invention with other known uricosurics or with other desired therapeutic and/or nutritive agents in dosage unit form.

The following example is included to illustrate the preparation of a representative dosage form:

EXAMPLE 40

Dry-filled capsules containing 50 mg. of active ingredient per capsule

Per capsule, mg.
N-methanesulfonyl - 4 - di-n-propylsulfamoylbenzamide _____ 50
Lactose _____ 149
Magnesium stearate _____ 1

Capsule (Size No. 1) _____ 200

The N - methanesulfonyl - 4 - di - n - propylsulfamoylbenzamide is reduced to a No. 60 powder and then lactose and magnesium stearate are passed through a No. 60 bolting cloth onto the powder and the combined ingredients admixed for 10 minutes and then filled into a No. 1 dry gelatin capsule.

Similar dry-filled capsules can be prepared by replacing the active ingredient of the above example by any of the other novel compounds of this invention.

It will be apparent from the foregoing description that the nuclear sulfamoyl(and sulfonyl)substituted benzamide products (I) of this invention constitute a valuable class of compounds which have not been prepared heretofore. One skilled in the art will also appreciate that the process disclosed in the above examples are merely illustrative and are capable of a wide variation and modification without departing from the spirit of this invention.

What is claimed is:
1. A compound of the formula:

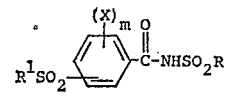

wherein R is lower alkyl, mononuclear cycloalkyl containing from 5 to 6 carbon atoms, lower alkenyl, phenyl, benzyl or 3-chloro-2-methylpropy-1-enyl; R¹ is an amino radical of the formula:

wherein Y¹ is hydrogen, lower alkyl or cycloalkyl containing from 5 to 6 nuclear carbon atoms and Y² is lower alkyl or cycloalkyl containing from 5 to 6 nuclear carbon atoms or Y¹ and Y², taken together, may be joined with the nitrogen to which they are attached to form a saturated 5- or 6-membered heterocyclic ring; X is hydrogen, halo, lower alkyl, trihalomethyl, nitro, carboxy, amino, alkylsulfonyl or sulfamoyl and m is an integer having a value of 1–4; or a non-toxic pharmacetutically acceptable salt thereof.

2. A compound according to claim 1 of the formula:

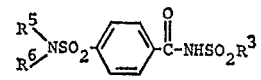

wherein R³ is lower alkyl or cycloalkyl containing from 5 to 6 nuclear carbon atoms and R⁵ and R⁶ are lower alkyl or a non-toxic pharmaceutically asseptable salt thereof.

3. A compound according to claim 2 wherein R³ is lower alkyl or mononuclear cycloalkyl containing from 5 to 6 nuclear carbon atoms and R⁵ and R⁶ are n-propyl or n-butyl.

4. A compound according to claim 3 wherein R³ is methyl.

5. A compound according to claim 3 wherein R³ is cyclohexyl and R⁵ and R⁶ are n-propyl.

6. A compound according to claim 3 wherein R³ is n-butyl and R⁵ and R⁶ are n-propyl.

References Cited

UNITED STATES PATENTS 3,560,563   2/1971   Childress et al. __ 260—556 AC
3,471,559   10/1969  Scherrer _____ 260—556 AC HENRY R. JILES, Primary Examiner S. D. WINTERS, Assistant Examiner U.S. Cl. X.R.

260—247.1, 293.73, 326.3, 518 R, 347.2, 294.8 F, 556 C, 544 M, 515 M, 141; 424—321, 248, 267, 274, 285, 263